United States Patent [19]

Bleustein et al.

[11] Patent Number: 4,568,101

[45] Date of Patent: Feb. 4, 1986

[54] AUTOMATIC SUSPENSION SYSTEM

[75] Inventors: Jeffrey L. Bleustein, Bayside; Erik F. Buell, Milwaukee, both of Wis.

[73] Assignee: Harley-Davidson Motor Co., Inc., Milwaukee, Wis.

[21] Appl. No.: 606,235

[22] Filed: May 2, 1984

[51] Int. Cl.⁴ .............................................. B60G 17/00
[52] U.S. Cl. .................................. 280/707; 280/6 R; 180/41
[58] Field of Search ............... 280/707, 708, 709, 702, 280/711, 714, 715, 6 R, 6 H; 180/41

[56] References Cited

U.S. PATENT DOCUMENTS

| | | | |
|---|---|---|---|
| 3,027,176 | 3/1962 | Frick et al. | 280/124 |
| 3,218,088 | 11/1965 | Nallinger et al. | 280/6 |
| 3,314,685 | 4/1967 | Bothwell | 280/6 |
| 3,572,747 | 3/1971 | Pollinger et al. | 280/124 |
| 3,603,612 | 9/1971 | Hill et al. | 280/124 |
| 3,738,680 | 6/1973 | Pollinger et al. | 280/124 |
| 3,770,292 | 11/1973 | Palazzetti | 280/124 |
| 3,992,039 | 11/1976 | Hiruma | 280/703 |
| 4,212,484 | 7/1980 | Fujii | 280/707 |
| 4,377,293 | 3/1983 | Senoo | 280/707 |
| 4,402,375 | 9/1983 | Glaze | 280/707 |
| 4,422,661 | 12/1983 | Kawamura | 280/276 |
| 4,462,610 | 7/1984 | Saito | 280/707 |

Primary Examiner—Richard A. Bertsch

[57] ABSTRACT

An automatic suspension system for a vehicle lowers the vehicle ride height when the vehicle is operated below a predetermined speed and when the vehicle is at rest so that the vehicle has a lower center of gravity for better balance and easier passenger boarding characteristics. The vehicle is elevated when it is operated above the predetermined speed to increase suspension travel and ground clearance. The raising and lowering of the suspension can also be varied depending on acceleration or deceleration characteristics or the combination thereof with vehicle speed. The correct ride height can be maintained for different loadings and is not affected by road irregularities. The system also responds quickly and adjusts ride height in a short period of time. While the present invention is adaptable to a wide variety of vehicles, it is particularly well suited for motorcycles.

20 Claims, 5 Drawing Figures

AUTOMATIC SUSPENSION SYSTEM

BACKGROUND OF THE INVENTION

1. Field of the Invention

The present invention relates generally to the art of vehicle suspension systems and more particularly to suspension systems of the type which lower the vehicle when the vehicle is at rest or is operated below preset parameters but which elevate the vehicle when the vehicle is operated above said preselected parameters.

2. Description of the Prior Art

While the principles of the present invention are applicable to many kinds of vehicles, certain aspects of the prior art will be discussed in the context of the motorycycle art. Following such discussion, several patents will be described which relate to adjustable suspension systems for other types of vehicles, such as railroad cars and automobiles.

A typical motorcycle has a seat for the rider, the design height of which is determined principally to provide leg comfort for the rider. A hinged footrest is also provided. On the one hand, the footrest must be sufficiently low with respect to the seat for rider comfort, but, at the same time, it must be high enough to clear the ground during cornering of the bike. The compromise which has been adopted by the motorcycle industry has been to use a higher seat height. That compromise has resulted in compromises of other important design criteria; the motorcycles are more difficult to board and are harder to balance at rest and at slow operating speeds when the seat height is raised to provide leg comfort.

Another consideration involved in motorcycle design is the width of chassis components. Even if it is preferable for certain reasons to make certain components wider, the width typically must be kept at a standard width or reduced therefrom if they are low on the bike so that the desired ground clearance can be maintained. The problem is so significant that various engine configurations, many of which offer substantial other benefits, have been largely ignored for this reason.

Compromises have been made using low seat heights and high or forward mounted footrests, but motorcycles embodying such features provide an awkward and uncomfortable ride, especially on longer trips.

Suspension travel is another significant aspect of motorcycle design. A long suspension travel provides a significant improvement in ride quality. However, it has been difficult to provide long suspension travel in street motorcycles, due to the aforementioned problems with seat height and ground clearance.

There is yet another problem which arises if the overall cycle height is increased because of clearance or seat height considerations, i.e. the capsize mode or non-oscillatory tip-over tendency which exists at rest or slow operating speeds becomes more difficult for the operator to control. At typical road speeds, the gyroscopic effect of the wheels will stabilize a taller vehicle.

A vehicle suspension system which would allow a low seat height at rest, at low speeds or during certain deceleration modes, but which would provide necessary ground clearance and suspension travel at road speeds and during certain acceleration modes for various loading conditions would represent a significant advance in this art.

Adjustable vehicle suspensions are known in the prior art, especially for such vehicles as automobiles and railroad cars. Resort to such prior art, however, does not provide solutions to the above noted problems. A summary of several prior art patents will illustrate the different approaches which have been used and the different problems which such patents are attempting to overcome.

Frick et al., in U.S. Pat. No. 3,027,176 issued Mar. 27, 1962 for "Leveling Apparatus For Fluid Suspension Systems," disclose a system for preventing rapid fluctuation in suspension fluid pressure while a car is in motion but which allows rapid fluctuations when the vehicle is stopped or is being operated at slow speeds. The system is designed to prevent deterioration of handling characteristics as a vehicle corners, for example, in an S-shaped curve. Frick et al. employ a first vehicle speed responsive flow rate control valve located in the fluid line to the air springs. A second speed responsive flow control valve is located in the discharge line of the air springs, and a pressure pump is connected to the drive shaft of the vehicle which is responsive to changes in vehicle speed. When the vehicle is at rest, the pump is inactive and the valves allow an unrestricted flow through the fluid valves. In this condition, air can rapidly move in and out of the lines to permit rapid leveling of the vehicle in response to changes in vehicle loading due to passenger weight shifts or other weight changes. When the vehicle is accelerated, the pump develops pressure which in turn restricts fluid flow so that only sway changes lasting several seconds or more will substantially affect body support. Frick et al. is primarily directed to automobile support systems and is not applicable to the resolution of the motorcycle problems mentioned above. In fact, the concept is virtually the opposite of what is required to solve such motorcycle problems because preload is added in Frick et al. to compensate for extra loading at rest, while an ideal solution to the above-mentioned problems would remove the suspension preload at rest.

Systems are also known which compensate for vehicle load if the vehicle is travelling through a curved path. One such system is described in U.S. Pat. No. 3,572,747 issued to Pollinger et al. on Mar. 30, 1971 for "Air Suspension System For Vehicles." A compressor is used in this patent and is driven by a speed responsive clutch so that it only operates when the vehicle travels above a preselected speed. Level regulators are also provided which regulate suspension pressure depending on whether the vehicle is moving in a straight path or whether there is a sensed difference in the height of the longitudinal tilt axis of the vehicle. Pollinger et al. is also directed to automotive type vehicles.

Pollinger et al., in their U.S. Pat. No. 3,738,680 issued June 12, 1973 for "Pneumatic Suspension System for Vehicles" describe a bellows system used with railroad vehicles. The system switches from a four point to a three point suspension system when the vehicle is at rest or is operating at lower speeds. In the preferred embodiment of this patent, the change takes place when the pneumatic door closing device of the railroad car is actuated.

Hill et al., in their U.S. Pat. No. 3,603,612 issued Sept. 7, 1971 for "Suspension Systems For Road Vehicles" disclose a suspension in which dampening characteristics are increased above a predetermined vehicle speed. Vehicle height is not adjusted when the vehicle is at rest.

Palazzetti discloses another suspension system in U.S. Pat. No. 3,770,292 issued Nov. 6, 1973 for "Electronic Control For Vehicle Suspension Systems." Suspension stiffness is varied with increasing and decreasing speed. Transverse acceleration is also compensated for, as are the transient vertical forces acting on the wheels due to unevenness of the road surface. Vehicle ride height is not altered at different speeds.

Another self-leveling vehicle suspension system is disclosed in Hiruma's U.S. Pat. No. 3,992,039 issued Nov. 16, 1976 for "Self-Levelling Vehicle Suspension System." This system compensates for pitch forward and in the rearward direction during acceleration or deceleration of the vehicle by restraint on a stabilizer bar. The control unit coupled to the bar is arranged to operate in a hydromechanical, electromechanical or hydroelectrical mode responsive to acceleration or deceleration.

Finally, several prior art patents disclose systems which allow the operator to lower the vehicle while it is at rest. For example, Fujii discloses a "Hydropneumatic Suspension System" in U.S. Pat. No. 4,212,484 issued July 15, 1980. The system lowers the level of the automobile, limousine or van to afford entry/exit and loading/unloading ease. A solenoid valve cuts the supply of fluid to self-leveling suspension units while inlets of the units are coupled to a reservoir by way of a relief valve. Other systems of this type include Bothwell's U.S. Pat. No. 3,314,685 issued Apr. 18, 1967 for "Low-Loading Road Vehicle" and Nallinger et al. U.S. Pat. No. 3,218,088 issued Nov. 16, 1965 for "Arrangement To Facilitate The Accessibility Of A Passenger Motor Vehicle." In the latter, the vehicle is raised to facilitate entry/exit, and the former relates to unique problems associated with ambulance loading and unloading, the chassis in Bothwell being lowered to the ground to permit loading of an injured person. None of these latter three patents disclose a speed-controlled automatic suspension lowering system which lowers the vehicle when it is at rest or is being operated below a certain speed and raises the vehicle above such speed.

A motorcycle suspension system is disclosed in Kawamura's U.S. Pat. No. 4,422,661 issued Dec. 27, 1983 for "Height Adjusting System for Motorcycles." This system uses an air pump driven by an electric motor which is activated by current flowing through a movable contact on the speedometer needle and a first fixed contact strip which covers the range from a predetermined low speed to the maximum speedometer speed. The air pump fills a high pressure tank which is then connected by air lines to electromagnetic valves which allow pressure to be provided to front and rear air suspension components. When each suspension pressure reaches its respective predetermined value, a pressure switch activates a solenoid which closes its respective valve and stops supplying current to the pump. Therefore, when both predetermined pressures have been reached, the pump is shut off and the filling valves are closed. When the speedometer needle indicates a speed at or below the predetermined speed, the movable contact passes current through a second fixed contact strip. This current opens exhaust valves which release the air from the suspension, thereby lowering the vehicle.

This system suffers from a number of design shortcomings. Current to run a pump of sufficient output to raise the vehicle in a short time is approximately 10 amperes at 12 volts. This current flow would cause significant problems with the sliding contact switching method described in this patent, unless the speedometer assembly was sealed and evacuated. Maintaining sufficient pressure to avoid contact opening due to vibration and road shock would affect speedometer response, and would cause wear. Another problem with the system is the lack of compensation for changes in vehicle loading, as different loads require different suspension pressures to maintain the correct ride height. A further problem is the use of a high pressure tank, which requires additional air volume, and increases the time required to fill the system and raise the vehicle. This tank may have been added to make use of a small pump requiring minimal current. In repeated stop and go use of the vehicle, as in use in city traffic, the tank would be depleted, and would even more significantly delay the raising of the vehicle.

Yet another problem with the patented system is a lack of any disarming system for the pump and valves. As the vehicle crosses large road irregularities the pressure in the suspension rises and falls. This system would, therefore, add pressure each time the suspension was unweighted, until the predetermined pressure was achieved at full suspension extension. This would raise the vehicle excessively, and increase the suspension rate beyond what is desirable. An additional problem with the aforesaid system is the lack of a dryer for the air. The large quantities of air required by this type of system would require a dryer of significant size and/or sophistication. Moreover, there is no signal for the vehicle operator to indicate that the vehicle is in the lower position. This would be required for safe operation of the vehicle in case of an air leak or pump failure.

OBJECTS AND SUMMARY OF THE INVENTION

It is a primary object of the present invention to provide an automatic lowering suspension system for a vehicle.

Another object of the present invention is to provide a suspension system for motorcycles which allows for flexibility in design for seat, footrest and engine components.

A different object of the present invention is to provide a vehicle suspension system which allows for optimum vehicle handling characteristics under a variety of speed and acceleration or deceleration conditions.

How these and other objects of the present invention are accomplished will be described in connection with the following description of a preferred and two alternate embodiments taken in conjunction with the drawings. Generally, however, the present invention provides a vehicle suspension system which automatically lowers the vehicle at low speeds and at rest and which then elevates the vehicle at road speeds. Ride height can be selected by the operator or may be preset at the factory. Air or hydraulic suspension may be employed. The invention may also be adapted to vary the aforementioned lowering and elevation depending on certain acceleration or deceleration conditions.

DESCRIPTION OF THE DRAWINGS

In the drawings, like reference numerals are used to identify like components.

DETAILED DESCRIPTION OF THE PREFERRED AND ALTERNATE EMBODIMENTS

Figure 1:
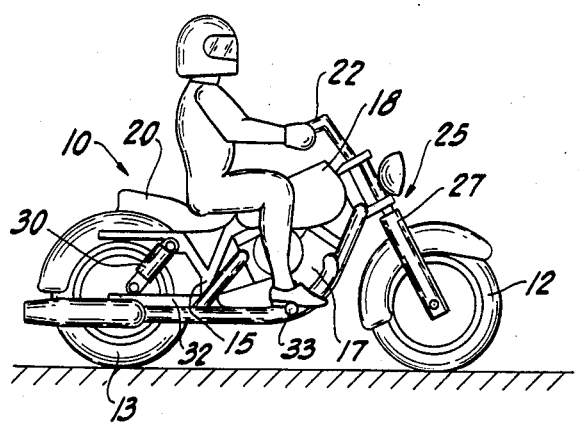
FIG. 1 is a side elevation view, in general form, of a typical motorcycle with which the present invention may be employed.

FIG. 1 shows a motorcycle 10 with which the present invention may be employed. Motorcycle 10 will be described in very general terms and includes front and back wheels 12 and 13, respectively, and a frame 15 for supporting the engine 17, gas tank 18 and seat 20. The handlebars 22 are coupled to the front wheel 12 through a fork assembly 25 which extends on either side of the wheel 12 and which includes a suspension system 27 for absorbing road bumps and otherwise providing a smooth ride for the driver. Motorcycle 10 also typically includes a pair of rear shock absorbers 30 coupled between a rear portion of frame 15 (beneath the seat) and to the wheel support members 32. Shock absorbers 30 provide the rear suspension system. It is the front fork suspension system 27 and the shock absorbers 30 with which the present invention is primarily concerned.

Seat height and the position of footrest 33 are determined by the ength of the shock absorbers 30 and front fork suspension system 27, as is the overall height of the motorcycle when it is parked and when a driver is seated thereon. The spring forces of these two components, as well as the overall length thereof also determine the height, and, of course, will vary under different load conditions.

Figure 2:
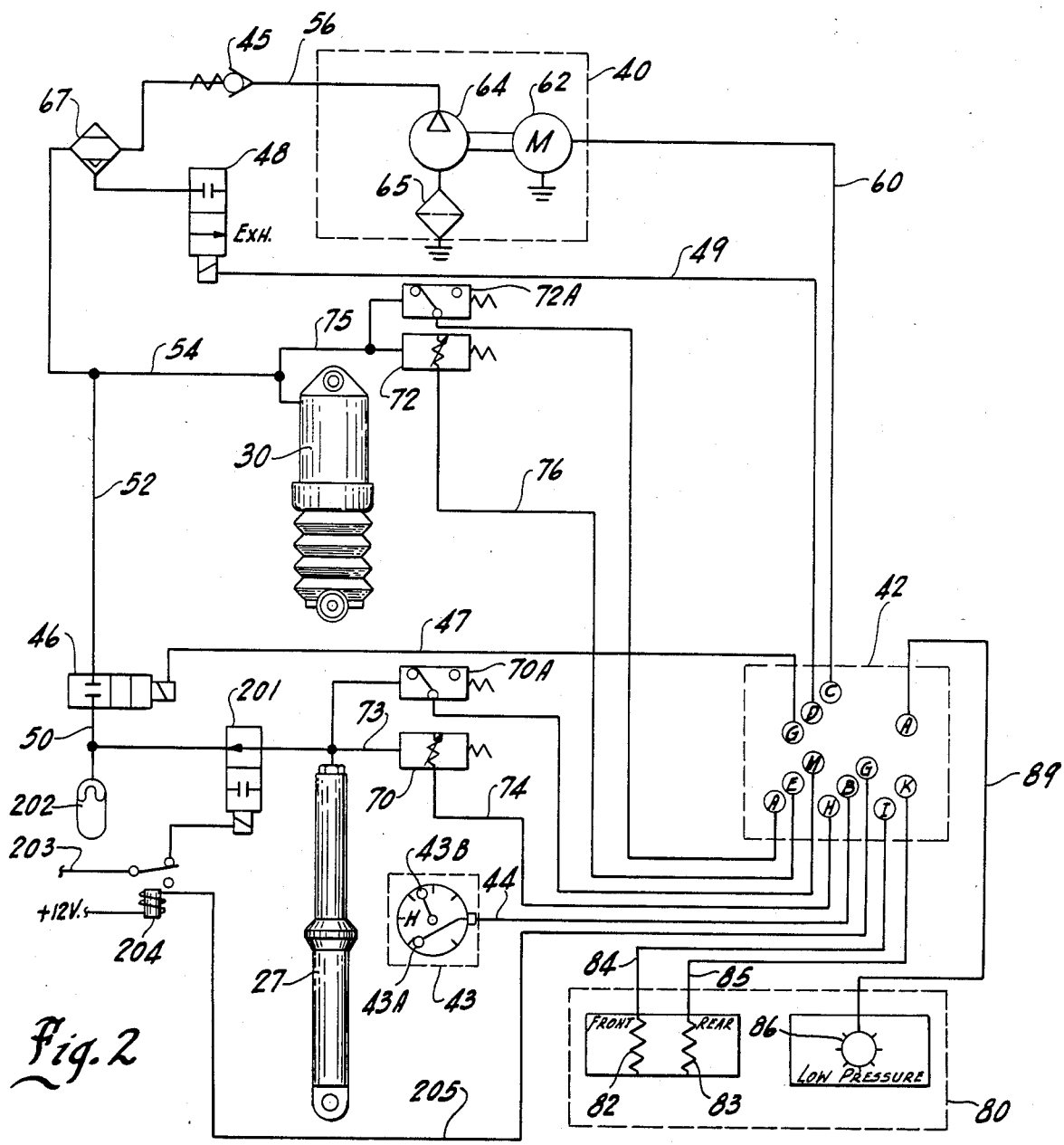
FIG. 2 is a schematic diagram of the suspension control system of the preferred embodiment of the present invention.

In the preferred embodiment of the invention, as illustrated in FIG. 2, an on board air compressor system 40 is employed to vary the suspension characteristics of the front fork suspension system 27 and the rear shock absorbers 30 in accordance with logic generated by an on board microprocessor system 42. In the preferred embodiment, the motorcycle 10 is elevated by 3-4 inches. A series of valves, sensors and a control panel are also provided and will be discussed in detail as the description of the preferred embodiment proceeds.

Vehicle speed is determined in this embodiment by the vehicle's speedometer 43 which has a photoelectric switch 43A. When the speedometer needle is below a preselected value, e.g., ten to fifteen miles per hour, the photocell is blocked by a tab 43B on the indicator needle, and no current flows to connection H in the microprocessor 42. Above the preselected value, the tab moves from the photopath and current does flow to connection H. Signals are thereby generated by microprocessor 42 to a pair of valves 46 and 48 through lines 47 and 49 respectively. Valve 46 is a two-way valve and valve 48 is illustrated as a two-way valve, although a three-way valve may be employed directly in line.

Valve 46 is coupled to the front fork suspension assembly 27 by an air conduit 50 and is also coupled to valve 48 by air conduit 52. A branch air conduit 54 couples conduit 52 to the rear shock absorbers 30. Valve 48 is coupled by air conduit 56 to the air compressor system 40 and a check valve 45 is provided in conduit 56.

The air compressor system 40 is also coupled to microprocessor system 42 by line 60 and the system itself includes a motor 62, a compressor 64, air filter 65 and a dryer 67. Valve 48, it should be noted, exhausts through dryer 67, thereby expelling excess trapped water from the system.

As mentioned previously, below a preset speed (e.g., ten to fifteen miles per hour), the signals to valves 46 and 48 will cause valve 46 to be opened and will cause valve 48 to be opened to the atmosphere, whereby no air pressure will be provided to either suspension system and the vehicle will be in its lowermost position. The suspension provided in this mode will be limited to that provided by the springs within the front fork suspension assembly 27 and the rear shock absorbers 30.

A pair of pressure sensitive transducers 70 and 72 are also provided in the system to determine pressure in front fork suspension assembly 27 and the rear shock absorbers 30 respectively. Transducer 70 is coupled to the air supply conduit 50 of assembly 27 by another air conduit 73 and to microprocessor 42 by line 74. Transducer 72 is coupled to the air supply conduit 54 of shock absorbers 30 by yet another air conduit 75 and to microprocessor 42 by line 76.

When the vehicle is accelerated, the speed signal is analyzed by the microprocessor 42 and when a preselected speed is exceeded, a series of changes are simultaneously initiated by the microprocessor 42. The compressor 64 is activated and valve 48 is closed to the atmosphere, all resulting in a pressurization mode for the two suspension assemblies. Valve 46 remains open.

As pressurization progresses, the suspension pressures in the suspension assemblies are read by the transducers 70 and 72 which in turn continuously send information to the microprocessor. Typically, the front suspension 27 will reach the desired level of pressurization first, and when a preselected pressure is reached in assembly 27, as read by transducer 70, valve 46 will be closed to air flow. The microprocessor continues to check the front and rear pressures, and will allow valve 46 to reopen if both the rear suspension and front suspension pressures are below the respective preselected values. Pressurization of the rear shock absorbers 30 will then continue until the preset pressure therefor is achieved. The microprocessor 42 checks to make sure both front and rear pressures are at or above the pressures selected. At that point, compressor 64 will be shut down and disarmed so that pressure variations from road irregularities will not affect the suspensions. A closed air system has been established between check valve 45 and the suspension assemblies. Both the length of the suspension and the spring rates thereof have been increased to achieve the desired objects of the invention. Low pressure switches 70A and 72A continously monitor the pressures in the suspension system and if they decrease below their minimum preselected values, the microprocessor 42 will re-arm the pressurizing system through appropriate switching of valve 46 and activation of compressor 64.

FIG. 2 also shows features which may be added to the basic embodiment, if desired. A control panel 80 is provided and includes a pair of pressure adjustment levers 82 and 83 for front fork suspension assembly 27 and the rear shock absorbers 30, respectively. Adjusters 82 and 83 are coupled to the microprocessor 42 by electrical lines 84 and 85 respectively. Adjusters 82 and 83 may be set by the motorcycle operator to establish the desired elevated, operating suspension for each of the suspension elements. This feature presents an advantage over a simpler, factory preset device in that appropriate adjustments can be made depending on the weight of the particular rider, or to accommodate two riders. Control panel 80 also includes a low pressure indicator light 86 coupled to microporcessor 42 by line 89. This light, in cooperation with the adjusters, will inform the operator if the preset operating pressures are not being maintained and will also normally be illuminated when the vehicle is at rest or when it falls below the preset speed.

This embodiment also includes an air anti-dive valve system as described in U.S. patent application Ser. No. 405,309, filed Aug. 4, 1982 by the present inventor. The valve 201 is normally open to allow gas to flow freely from the front suspension 27 to an accumulator 202, but is closed during braking by current through a wire 203 from the brake light switch. For proper operation of the lowering system, relay 204 is activated by current through wire 205 from the microprocessor. This interrupts the current to valve 201 and allows the front suspension to deflate even if the brake is on.

Figure 3:
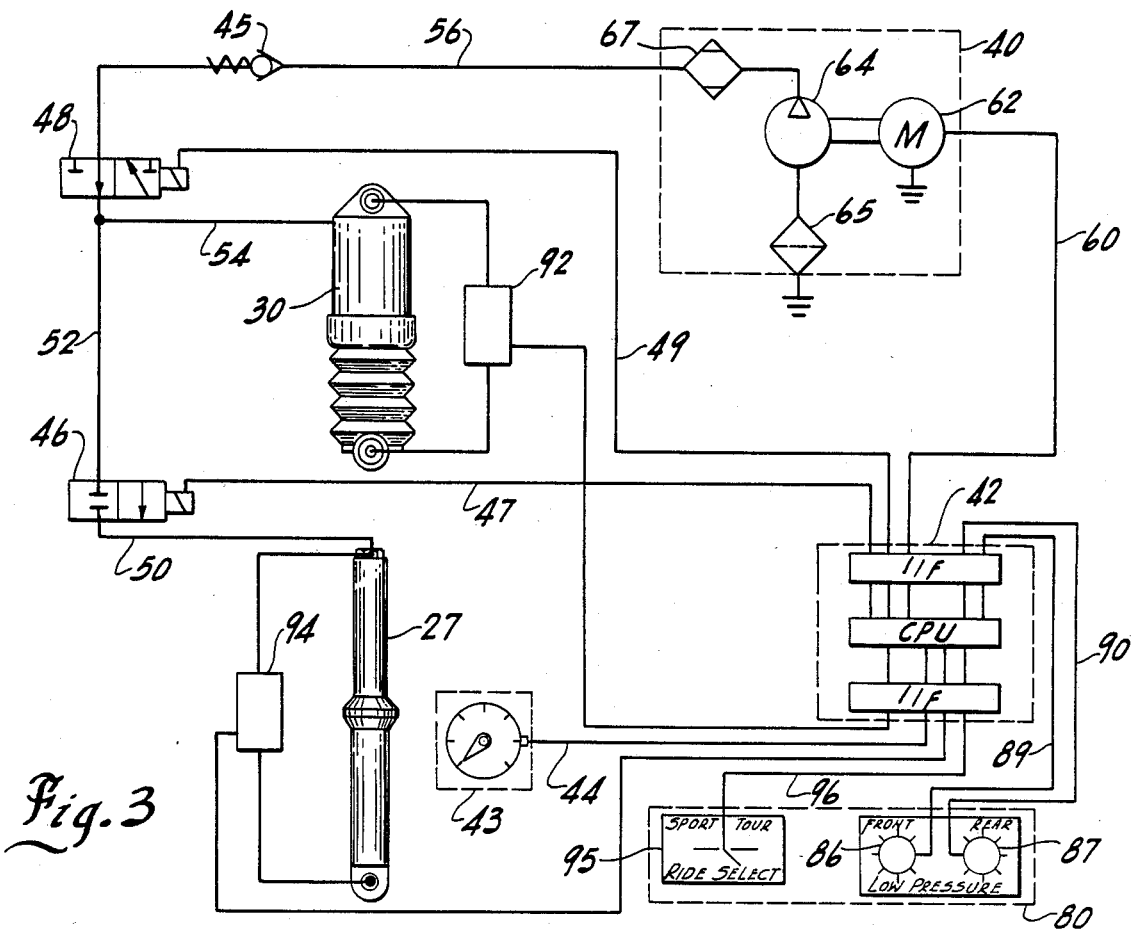
FIG. 3 is a schematic diagram of a first alternate embodiment of the present invention.

A second embodiment of the present invention is illustrated in FIG. 3, where many of the same components are employed. However, in this embodiment, a shock length sensor 92 is employed in lieu of pressure transducer 72 and a front fork length sensor 94 is employed in lieu of pressure transducer 70. In other words, instead of measuring pressure, the length of the suspension components is used to determine proper addition of air to these components. Moreover, instead of pressure adjustment levers 82 and 83, a two-position ride selector switch 95 is coupled to microprocessor 42 by line 96. In the illustrated embodiment of this FIGURE, the operator can select a "sport" setting having a firmer pressure (greater shock and fork length) or a "tour" setting having a softer pressure (a shorter shock and fork length). Obviously, the switch 95 could be used in the FIG. 2 embodiment, or the length sensors 92 and 94 could be used in the FIG. 2 embodiment, all providing an indication of the flexibility of the present invention.

Figure 4:
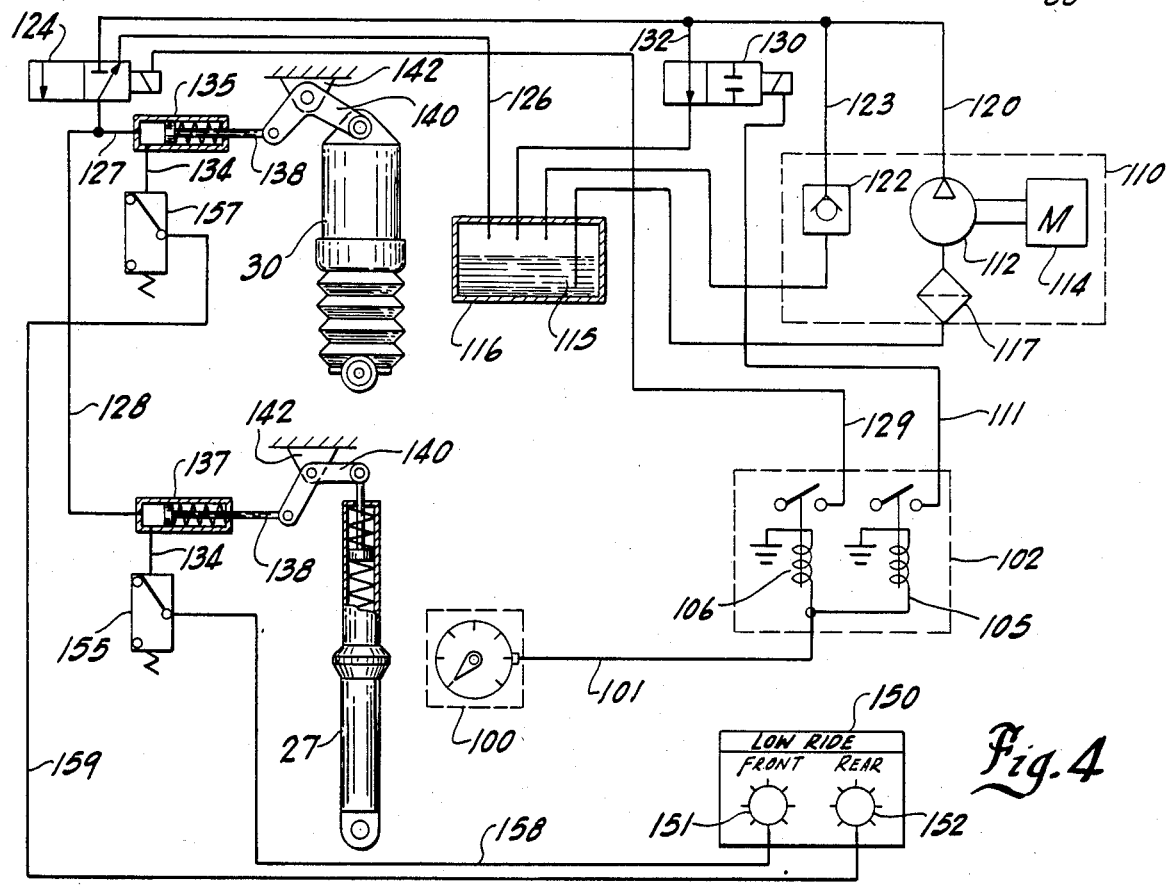
FIG. 4 is a schematic diagram of a second alternate embodiment of the present invention.

A third embodiment of the present invention is illustrated in FIG. 4. In this embodiment, the suspension is preset at the factory and hydraulics are employed instead of air pressure to regulate the front fork suspension system 27 and rear shocks 30. Also, in this embodiment the motorcycle is normally in its elevated position and the hydraulic system is used to lower the suspension components when the engine is running and the vehicle is at rest or is being operated below the preset speed.

A speed sensor 100 similar to 43 but providing current only when below the preset speed is associated with the vehicle speedometer and is coupled to a relay assembly 102 by line 101. Assembly 102 includes two relays 105 and 106, each of which is open when the vehicle speed is below the preset speed (for example, ten to fifteen miles per hour) and which close when that preset speed is exceeded. Relay 105 is coupled to a two-way valve 130 by electric line 111. Valve 130 is opened when the relays are closed. This allows fluid to be circulated in an unloaded condition. When valve 130 is closed, i.e., when the relays are open, the fluid is forwarded to valve 124.

Supply system 110 includes a pump 112 coupled to the vehicle engine 114 for pumping hydraulic fluid 115 from a reservoir 116 through filter 117. Hydraulic fluid leaves supply system 110 through line 120. A relief valve 122 is coupled to line 120 through branch 123 which is opened when pressure in line 120 exceeds the maximum pressure required for the suspension.

Relay 106 is coupled by line 129 to a hydraulic valve 124 which is of the three-way type. When relay 106 is open, valve 124 is opened to allow hydraulic fluid to flow from lines 128 and 127 through line 126 to reservoir 116. When relay 106 is closed, fluid 115 passes through the valve 124 to decrease the suspension length and spring rate characteristics of the front fork and rear shock assemblies as will now be described.

Fluid leaves valve 124 through conduit 128 having a branch conduit 127. Branch 127 and conduit 128 are coupled respectively to a pair of cylinders 135 and 137, each having a piston 138 extending therefrom. Cylinders 135 are spring loaded to retract the piston 138 and are designed so that the piston is extended in response to an increase in hydraulic pressure in branch 127 and conduit 134 of the hydraulic circuit.

When the compressor is activated, pressure is increased to cause the pistons 138 to extend, e.g., when the vehicle speed falls below the preset speed. For both cylinders, this results in a mechanical alteration of the suspension assemblies because the free ends of pistons 138 are coupled to a first end an L-shaped lever member 140, the central portion of which is rotatably coupled to brackets 142 affixed to the vehicle frame. It will be appreciated from FIG. 4 that extension of the pistons 138 will cause an upward elevation of the second end of the lever member 140. The latter are coupled respectively to the tops of the fork assembly 27 and rear shocks 30 and by such elevation the spring preload and effective length respectively are lowered to accomplish the objects of the invention. It will be noted from FIG. 4 that for the front fork, such lowering is accomplished by removing the factory preload from the internal spring.

FIG. 4 also shows a light panel 150 having indicator lights 151 and 152 to indicate high hydraulic pressure in the front fork assembly 27 and in the rear shocks 30, respectively. Pressure sensors 155 and 157 and coupled to lights 151 and 152 respectively by lines 158 and 159 and also to cylinders 137 and 135.

The FIG. 4 embodiment could also be modified as aforesaid to include variable ride adjustment devices such as shown in FIG. 2 or the selective ride adjustment features of FIG. 3.

Figure 5:
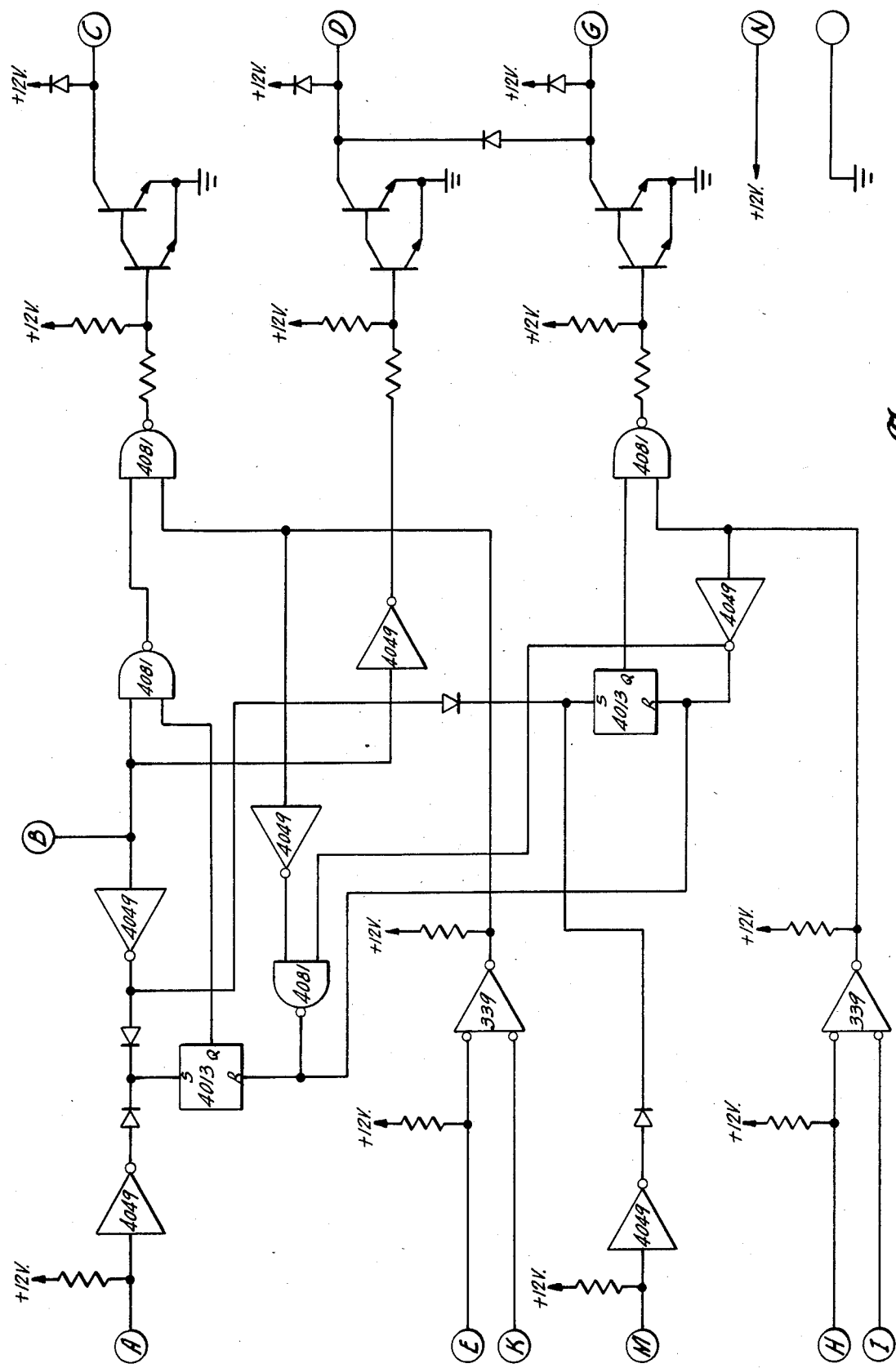
FIG. 5 is a schematic diagram of the microprocessor electrical circuit for the preferred embodiment of FIG. 2.

It will be apparent to those skilled in the art that a wide variety of options may be provided in the various systems, as long as they accomplish the principle object of the invention, i.e. elevation of the vehicle above a predetermined speed and/or when the vehicle is accelerating above a preset rate and lowering of the vehicle when it is at rest or is being operated below the preset speed and/or when the vehicle is decelerating at or above a preset rate. The various pumps, sensors, valves, transducers, relays and the like are readily available commercial products and need not be described in detail as they may be variously embodied. Also, the microprocessor unit 42 could be prepared in numerous ways which would be readily apparent to those skilled in the art after the present specification has been reviewed. Accordingly, the details of this component have not been provided except for the schematic of FIG. 5. Moreover, it should be appreciated that the principles of the invention are readily adaptable to other vehicles, for example, automobiles, golf cars, off-road vehicles, trucks, etc. So while the present invention has been described by reference to certain illustrated embodiments and with reference to motorcycles, it is not to be limited thereby but is to be limited solely by the claims which follow.

We claim:

1. An apparatus for changing the height and suspension characteristics of a vehicle depending on vehicle speed and/or the rate of change thereof comprising:

means for continuously sensing the speed of said vehicle;

suspension means for said vehicle, said suspension means being selectively adjustable, by addition or removal of fluid, from a first position wherein said vehicle is in a first lower position to a second raised position, the spring rate of said suspension means being different in said second position;

control means coupled to said sensing means and responsive to the means for sensing the speed of said vehicle;

fluid regulating means for said suspension means; and means coupling said control means to said fluid regulating means and means coupling said fluid regulating means to said suspension means, whereby said suspension system is caused to be in its first position when said vehicle is at rest or is moving below a preselected speed and/or is decelerating at or above a predetermined rate and is caused to be in said second position when said vehicle is moving above said preselected speed or is accelerating at or above a predetermined rate.

2. The invention set forth in claim 1 wherein said fluid regulating means is selected from the group consisting of air regulating means and hydraulic regulating means.

3. The invention set forth in claim 1 further comprising means for measuring the suspension characteristics of said suspension means and means coupling said control means to said measuring means.

4. The invention set forth in claim 3 further comprising indicator means coupled to said control means and to said measuring means to visually indicate any deviation in suspension characteristics from those characteristics required to maintain said suspension means in its second position.

5. The invention set forth in claim 3 wherein said measuring means is selected from the group consisting of means for measuring the fluid pressure of said suspension means or means for measuring the length of said suspension means.

6. The invention set forth in claim 1 wherein said fluid regulating means comprises pump means for supplying fluid to said suspension means and exhaust means for permitting fluid to be exhausted from said suspension means.

7. The invention se forth in claim 1 further comprising suspension selection means coupled to said control means to change said second position of said suspension means.

8. The invention set forth in claim 7 wherein said selection means is selected from the group consisting of a selection means providing a continual range pf second positions and a selection means providing at least two different preselected second positions for said suspension means.

9. The invention set forth in claim 1 wherein said control means is selected from the group consisting of relay means or microprocessor means.

10. A motorcycle having front and rear suspension systems, the improvement comprising an apparatus for causing said motorcycle to be placed in a first lower position when said motorcycle is at rest or is being operated below a preselected speed and/or is decelerating at or above a predetermined rate and for causing said motorcycle to be elevated from said first position when said motorcycle is being operated above said preselected speed or is accelerating at or above a predetermined rate, said apparatus comprising:

means for continuously sensing the speed of said motorcycle and for generating a signal responsive thereto;

means for selectively extending the length and increasing the spring rate and/or preload of said front and rear suspension systems to elevate said motorcycle from said first lower position;

control means coupled to said sensing means and to said extending means, said control means being responsive to said signal from said sensing means and said control means including means for causing said extension means to elevate said motorcycle from said first lower position when said motorcycle is being operated above said preselected speed or is accelerating at or above a preselected rate.

11. The invention set forth in claim 10 wherein said extending means includes means for supplying fluid to and exhausting fluid from said suspension systems.

12. The invention set forth in claim 11 wherein said fluid is selected from the group consisting of air and hydraulic fluid.

13. The invention set forth in claim 11 wherein said supplying means includes pump means.

14. The invention set forth in claim 10 further comprising means for measuring the suspension characteristics of said suspension systems and means coupling said measuring means to said control means.

15. The invention set forth in claim 14 further comprising indicator means coupled to said control means and to said measuring means to visually indicate any deviation in suspension characteristics from those characteristics required to maintain said motorcycle is in its elevated position.

16. The invention set forth in claim 11 wherein said measuring means is selected from the group consisting of means for measuring the fluid pressure of said suspension means and means for measuring the length of said suspension means.

17. The invention set forth in claim 10 further comprising selection means coupled to said control means to change the amount of said elevation of said motorcycle.

18. The invention set forth in claim 17 wherein said selection means is selected from the group consisting of a selector means providing a continual range of different elevated positions and a selection means providing at least two different preselected elevated positions for said motorcycle.

19. The invention set forth in claim 10 wherein said control means is selected from the group consisting of relay means or microprocessor means.

20. A motorcycle including a fluid adjustable front fork suspension system and fluid adjustable rear shock absorbers, said motorcycle further comprising:

fluid regulating means to selectively alter the front fork suspension system and said rear shock absorbers from a first position wherein said front fork suspension system and rear shock absorbers have a first length and first spring rate to a second position wherein said front fork suspension system and said rear shock absorbers have an increased length and increased spring rate;

means for sensing motorcycle speed, said sensing means generating a first signal means indicative thereof;

control means coupled to said sensing means and to said fluid regulating means, said control means including means to generate a second signal to said fluid regulating means in response to said first signal, measuring means coupled to said control means and to said front fork suspension system and to said rear shock absorbers for measuring the length or spring rate thereof, said measuring means including means to generate a third signal to said control means and said control means including means for generating a fourth signal to said fluid regulating means in response to said third signal;

whereby said motorcycle is at a first lower height when said motorcycle is at rest or is moving below a preselected speed or is decelerating at or above a predetermined rate and is elevated and maintained at an elevated height when said motorcycle is operated above said preselected speed or is accelerating at or above a predetermined rate.

* * * * *